United States Patent Office 3,822,329
Patented July 2, 1974

---

3,822,329
O,O-DIALKYL-S-PHENYL-DITHIOPHOSPHORIC ACID ESTERS
Hellmut Hoffmann, Wuppertal-Elberfeld, Jan Hempel, Leverkusen, and Wolfgang Behrenz and Ingeborg Hammann, Cologne, Germany, assignors to Bayer Aktiengesellschaft, Leverkusen, Germany
No Drawing. Filed Oct. 1, 1971, Ser. No. 185,809
Claims priority, application Germany, Oct. 10, 1970,
P 20 49 814.0
Int. Cl. A01n 9/36; C07f 9/16
U.S. Cl. 260—955       9 Claims

ABSTRACT OF THE DISCLOSURE

O,O-dialkyl-S-phenyl-dithiophosphoric acid esters of the general formula $$\begin{array}{c} RO \diagdown \overset{S}{\underset{\|}{P}} -S- \underset{(Hal)_n}{\diagup\!\!\diagdown} -CF_3 \\ R_1O \diagup \end{array} \quad (I)$$

in which

R and $R_1$ each is an alkyl radical with 1 to 6 carbon atoms,
Hal is a halogen atom, and
n is an integer from 0 to 4, which possess insecticidal properties.

---

The present invention relates to and has for its objects the provision of particular new O,O-dialkyl-S-phenyl-dithiophosphoric acid esters, i.e. O,O-dialkyl-S-(optionally halogenated-3-trifluoromethyl - phenyl)-dithiophosphates, which possess insecticidal properties, active compositions in the form of mixtures of such compounds with solid and liquid dispersible carrier vehicles, and methods for producing such compounds and for using such compounds in a new way especially for combating insects, with other and further objects becoming apparent from a study of the within specification and accompanying examples.

It is known from Deutsche Auslegeschrift (German Published Specification) 1,215,171 that dithiophosphoric acid esters, for example O,O-dimethyl-S-phenyl-dithiophosphoric acid ester (Compound A), exhibit insecticidal activity.

The present invention provides O,O-dialkyl-S-phenyl-dithiophosphoric acid esters of the formula $$\begin{array}{c} RO \diagdown \overset{S}{\underset{\|}{P}} -S- \underset{(Hal)_n}{\diagup\!\!\diagdown} -CF_3 \\ R_1O \diagup \end{array} \quad (I)$$

in which

R and $R_1$ each is an alkyl radical with 1 to 6 carbon atoms,
Hal is a halogen atom, and
n is an integer from 0 to 4.

These compounds exhibit a strong insecticidal effectiveness.

The invention also provides a process for the production of O,O-dialkyl-S-phenyl-dithiophosphoric acid esters of the formula (I) in which an O,O-dialkyl-thiophosphite of the formula $$\begin{array}{c} RO \diagdown \overset{S}{\underset{\|}{P}} -H \\ R_1O \diagup \end{array} \quad (II)$$

is reacted with a sulfenic acid halide of the formula $$\underset{(Hal)_n}{\diagup\!\!\diagdown} \overset{CF_3}{-S-Hal_1} \quad (III)$$

wherein R, $R_1$, Hal and n have the meanings stated above, and $Hal_1$ is a halogen atom, preferably a chlorine or bromine atom.

Surprisingly, the O,O-dialkyl-S-phenyl-dithiophosphoric acid esters according to the invention possess a substantially better insecticidal activity than the known dithiophosphoric acid esters of analogous constitution and direction of activity, coupled with low toxicity to warm-blooded animals. The substances according to the invention therefore represent a genuine enrichment of the art.

If O,O-dimethylthiophosphite and 3-trifluoromethylbenzene sulfenic acid chloride are used as starting materials, the reaction course can be represented by the following formula scheme:

$$(CH_3O)_2\overset{S}{\underset{\|}{P}}-H + Cl-S-\underset{}{\diagup\!\!\diagdown}-CF_3 \xrightarrow{-HCl}$$
(IIa)               (IIIa)

$$(CH_3O)_2\overset{S}{\underset{\|}{P}}-S-\underset{}{\diagup\!\!\diagdown}-CF_3 \quad (IV)$$
(1)

Preferably, R and $R_1$ each is a lower alkyl radical with 1 to 4 carbon atoms, such as methyl, ethyl, n- or iso-propyl-, n-, sec.-, tert.- or iso-butyl, Hal is preferably chlorine, and n is preferably an integer from 0 to 2.

As examples of thiophosphites to be used in the process, there are mentioned in particular: O,O-dimethyl-, O,O-diethyl-, O,O-dipropyl-, O,O-di - iso - propyl-, O,O-dibutyl-, O,O-di-tert.-butyl-, O-methyl-O-ethyl-, O-ethyl-O-propyl-, O-ethyl-O-iso-propyl-, O-methyl-O-iso-propyl-, O-iso-propyl-O-butyl-, O-propyl-O-tert.butyl- and O-butyl-O-methyl-thiophosphite.

The thiophosphites to be used as starting materials are known can be prepared according to customary methods. The sulfenic acid halides are expediently prepared according to a new process by reacting benzotrifluorides (V) with chlorosulfonic acid to give the appropriate sulfonic acid chlorides (VI), reducing these to the disulfides (VII) and, finally, splitting the latter into sulfenic acid halides by halogenation.

This reaction can be represented by the following formula scheme:

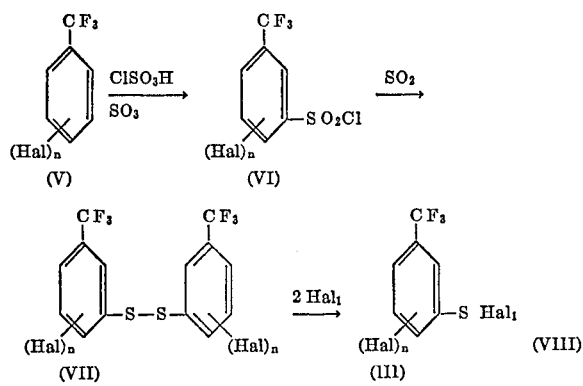

The preparative process for the new O,O-dialkyl-S-phenyldithiophosphoric acid esters is preferably carried out with the use of suitable solvents or diluents. As such, practically all inert organic solvents are suitable. These include, above all, aliphatic and aromatic optionally chlorinated hydrocarbons, such as benzene, toluene, xylene, benzine, methylene chloride, chloroform, carbon tetrachloride, chlorobenzene; ethers, such as diethyl and dibutyl ether, dioxane; further, ketones, for example acetone, methyl ethyl, methyl-iso-propyl and methyl-iso-butyl ketone; and nitriles, such as acetonitrile and propionitrile.

The reaction temperature can be varied within a fairly wide range. In general, the reaction is carried out at from about 0 to 100° C., preferably at about 15 to 30° C.

The reaction is, in general, carried out at normal pressure.

In carrying out the process, the starting materials are in most cases used in equimolar proportions. An excess of one or other of the reaction components brings no substantial advantages. The reaction is preferably carried out in the presence of one of the above-mentioned solvents at the temperatures stated and the reaction mixture, after several hours' stirring, is worked up in customary manner.

The substances according to the invention are in most cases obtained in the form of colorless to slightly yellow-colored, viscous, water-insoluble oils which cannot be distilled without decomposition but can, by so-called "slight distillation," i.e. by prolonged heating at moderately elevated temperatures under reduced pressure, be freed from the last volatile components and can in this way be purified. The refractive index is particularly useful for characterizing the compounds. If they are obtained in crystalline form, they may be characterized by their melting points.

As already mentioned, the new O,O-dialkyl-S-phenyl-dithiophosphoric acid esters are distinguished by an outstanding insecticidal effectiveness against plant pests, hygiene pests and pests of stored products. They possess a good activity against both sucking and eating insects. At the same time, they exhibit a low phytotoxicity.

For these reasons, the compounds according to the invention can be used with success as pesticides in crop protection and the protection of stored products, as well as in the hygiene field.

To the sucking insects contemplated herein there belong, in the main, aphids (*Aphidae*) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (*Coccina*), for example the oleander scale (*Aspidiotus hederae*) and the soft scale (*Lecanium hesperidum*) as well as the grape mealybug (*Pseudococcus maritimus*); thrips (*Thysanopetra*), such as *Hercinothrips femoralis*, and bugs, for example the example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (*Lepidoptera*) such as the diamond-back moth (*Plutella maculipennis*), the gypsy moth (*Lymantria dispar*), the brown-tail moth (*Euproctis chrysorrhoea*) and tent caterpiller (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*) the green oak tortrix moth (*Tortrix viridana*), the fall armyworm (*Laphygma frugiperda*) and cotton worm (*Prodenia litura*), the ermine moth (*Hyponomeuta padella*) the Mediterranean flour moth (*Ephestia küniella*) and greater wax moth (*Galleria mellonella*); and the like.

Also to be classed with the biting insects contemplated herein are beetles (*Coleoptera*), for example the granary weevil (*Sitophilus granarius*=*Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius*=*Acanthoscelides obtectus*), the leather bettle (*Dermestes frischi*), the khrapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworm (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further gnats, for example mosquitoes such as the yellow fever mosquito (*Aedes aegypti*), the northern house mosquito (*Culex pipiens*) and the malaria mosquito (*Anopheles stephensi*); and the like.

The active compounds according to the instant invention can be utilized, if desired, in the form of the usual formulations or compositions with convenient inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc), cyclohexane, paraffins (e.g. petroleum fractions), chlorinated aliphatic hydrocarbons( e.g. methylene chloride, chloroethylenes, etc.), alcohols (e.g. methanol, ethanol, propanol, butanol, glycol, etc. as well as their ethers and esters, amines (e.g. ethanolamine, etc.), ether-alcohols (e.g. glycol monomethyl ether, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emusifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, or acaricides, fungicides, bactericides, nematocides, rodenticides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling insects which comprises applying to at least one of (a) such insects, and (b) the habitat thereof, i.e. the locus to be protected, a correspondingly combative or toxic amount, i.e. an insecticidally effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

$LD_{100}$ test

Test insects: *Blatta orientalis* (females)
Solvent: acetone.

2 parts by weight of the active compound are dissolved in 1000 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. 10 test insects are then placed in the Petri dish and it is covered with a glass lid.

The condition of the test insects is observed 3 days after the commencement of the experiments. The destruction is determined as a percentage.

The active compounds, the concentrations of the active compounds, the test insects and the results can be seen from the following Table 1.

TABLE 1

($LD_{100}$ test/*Blatta orientalis*)

| Active compound | Concentration of active compound of the solution in percent | Degree of destruction in percent |
|---|---|---|
| (A) $(CH_3O)_2-\overset{S}{\underset{\|}{P}}-S-\langle\text{phenyl}\rangle$ (known). | 0.2<br>0.04<br>0.008 | 100<br>100<br>0 |
| (2) $(CH_3O)_2-\overset{S}{\underset{\|}{P}}-S-\langle\text{phenyl}\rangle-Cl$ (with $CF_3$) | 0.2<br>0.04<br>0.008<br>0.0016 | 100<br>100<br>100<br>0 |
| (1) $(CH_3O)_2-\overset{S}{\underset{\|}{P}}-S-\langle\text{phenyl}\rangle$ (with $CF_3$) | 0.2<br>0.04<br>0.008<br>0.0016 | 100<br>100<br>100<br>80 |

EXAMPLE 2

$LD_{100}$ test

Test insects: *Acheta domesticus* (femalis)
Solvent: acetone.

2 parts by weight of the active compound are dissolved in 1000 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. 10 test insects are then placed in the Petri dish and it is covered with a glass lid.

The condition of the test insects is observed 3 days after the commencement of the experiments. The destruction is determined as a percentage.

The active compounds, the concentrations of the active compounds, the test insects and the results can be seen from the following Table 2.

TABLE 2
($LD_{100}$ test/*Acheta domesticus*)

| Active compound | Concentration of active compound in percent | Degree of destruction in percent |
|---|---|---|
| (A) $(CH_3O)_2-\overset{S}{\underset{\|}{P}}-S-\langle\text{phenyl}\rangle$ (known) | 0.2<br>0.04<br>0.008 | 100<br>100<br>0 |
| (2) $(CH_3O)_2-\overset{S}{\underset{\|}{P}}-S-\langle\text{phenyl-}CF_3\rangle-Cl$ | 0.2<br>0.04<br>0.008<br>0.00016 | 100<br>100<br>100<br>0 |
| (3) $(C_2H_5O)_2-\overset{S}{\underset{\|}{P}}-S-\langle\text{phenyl-}CF_3\rangle-Cl$ | 0.2<br>0.04<br>0.008<br>0.0016 | 100<br>100<br>100<br>0 |
| (4) $(C_2H_5O)_2-\overset{S}{\underset{\|}{P}}-S-\langle\text{phenyl-}CF_3\rangle$ | 0.2<br>0.04<br>0.008 | 100<br>100<br>80 |

EXAMPLE 3

$LD_{100}$ test

Test insects: *Dermestes peruvianus*
Solvent: acetone.

2 parts by weight of the active compound are dissolved in 1000 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. 25 test insects are then placed in the Petri dish and it is covered with a glass lid.

The condition of the test insects is observed 3 days after the commencement of the experiments. The destruction is determined as a percentage.

The active compounds, the concentrations of the active compounds, the test insects and the results can be seen from the following Table 3.

TABLE 3
($LD_{100}$ test/*Dermestes puruvianus*)

| Active compound | Concentration of active compound of the solution in percent | Degree of destruction in percent |
|---|---|---|
| (A) $(CH_3O)_2-\overset{S}{\underset{\|}{P}}-S-\langle\text{phenyl}\rangle$ (known) | 0.2<br>0.04<br>0.008<br>0.0016 | 100<br>100<br>100<br>0 |
| (2) $(CH_3O)_2-\overset{S}{\underset{\|}{P}}-S-\langle\text{phenyl-}CF_3\rangle-Cl$ | 0.2<br>0.04<br>0.008<br>0.0016<br>0.00032 | 100<br>100<br>100<br>100<br>60 |
| (3) $(C_2H_5O)_2-\overset{S}{\underset{\|}{P}}-S-\langle\text{phenyl-}CF_3\rangle-Cl$ | 0.2<br>0.04<br>0.008<br>0.0016 | 100<br>100<br>100<br>80 |
| (1) $(CH_3O)_2-\overset{S}{\underset{\|}{P}}-S-\langle\text{phenyl-}CF_3\rangle$ | 0.2<br>0.04<br>0.008<br>0.0016<br>0.00032 | 100<br>100<br>100<br>100<br>40 |

EXAMPLE 4

Phaedon larvae test

Solvent: 3 parts by weight acetone
Emulsifier: 1 part by weight alkylaryl polyglycol ether.

To produce a suitable preparation of active compound, 1 part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100% means that all the beetle larvae are killed. 0% means that none of the beetle larvae are killed.

The active compounds, the concentration of the active compound, the times of evaluation and the results can be seen from the following Table 4.

TABLE 4
(Phaedon-larvae test)

| Active compound | Concentration of active compound in percent | Degree of destruction in percent after 3 days |
|---|---|---|
| (B) $(CH_3O)_2-\overset{S}{\underset{\|}{P}}-S-\langle\text{phenyl}\rangle-Cl$ (known) | 0.1<br>0.01<br>0.001 | 100<br>100<br>0 |
| (2) $(CH_3O)_2-\overset{S}{\underset{\|}{P}}-S-\langle\text{phenyl-}CF_3\rangle-Cl$ | 0.1<br>0.01<br>0.001 | 100<br>100<br>85 |
| (3) $(C_2H_5O)_2-\overset{S}{\underset{\|}{P}}-S-\langle\text{phenyl-}CF_3\rangle-Cl$ | 0.1<br>0.01<br>0.001 | 100<br>100<br>60 |

EXAMPLE 5

Plutella test

Solvent: 3 parts by weight acetone
Emulsifier: 1 part by weight alkylaryl polyglycol ether.

To produce a suitable preparation of active compound, 1 part by weight of the active compound is mixed with the stated amount of solvent containing the stated amount of emulsifier and the concentrate is diluted with water to the desired concentration.

Cabbage leaves (Brassica oleracea) are sprayed with the preparation of the active compound until dew moist and then infested with caterpillars of the diamond-back moth (Plutella maculipennis).

After the specified periods of time, the degree of destruction is determined as a percentage: 100% means that all the caterpillars are killed whereas 0% means that none of the caterpillars are killed.

The active compounds, the concentrations of the active compounds, the evaluation times and the results can be seen from Table 5.

TABLE 5
(Plutella test)

| Active compound | Concentration of active compound in percent | Degree of destruction in percent after 3 days |
|---|---|---|
| (B) 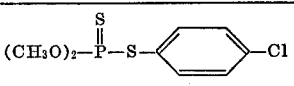 (known). | 0.1<br>0.01<br>0.001 | 100<br>100<br>0 |
| (2) 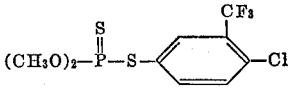 | 0.1<br>0.01<br>0.001<br>0.0001 | 100<br>100<br>100<br>60 |
| (3) 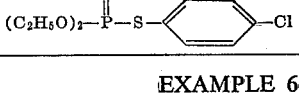 | 0.1<br>0.01<br>0.001 | 100<br>100<br>75 |

EXAMPLE 6

Myzus test (contact action)

Solvent: 3 parts by weight acetone
Emulsifier: 1 part by weight alkylarylpolyglycol ether.

To produce a suitable preparation of active compound, 1 part by weight of the active compound is mixed with the stated amount of solvent containing the stated amount of emulsifier and the concentrate is diluted with water to the desired concentration.

Cabbage plants (Brassica oleracea) which have been heavily infested with peach aphids (Myzus persicae) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 6.

TABLE 6
(Myzus test)

| Active compound | Concentration of active compound in percent | Degree of destruction in percent after 1 day |
|---|---|---|
| (B) 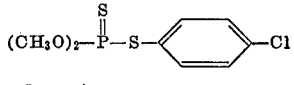 (known). | 0.1<br>0.01 | 98<br>20 |
| (5) 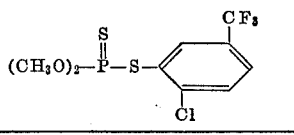 | 0.1<br>0.01 | 100<br>98 |

The following further examples are set forth to illustrate, without limitation, the process for producing the active compounds according to the present invention.

EXAMPLE 7

(a)
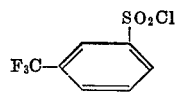
(VIa)

350 g. of benzotrifluoride are added dropwise, at 5° C., to a mixture of 500 cc. of chlorosulfonic acid and 175 cc. of 65%-strength oleum. After 5 hours' stirring, the solution is poured onto ice and the separated oil is isolated. 450 g. (=77% of theory) of 3-trifluoromethylbenzenesulfonic acid chloride with the refractive index $n_D^{20}=1.4860$ are obtained.

(b)
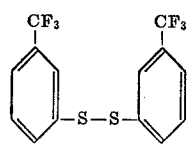
(VIIa)

239 g. of hydrated sodium sulfite are dissolved in 100 cc. of water and 0.85 mole of 3-trifluoromethylbenzenesulfonic acid chloride, obtained in (a), is added at 50 to 60° C. By means of a total of 140 g. of 50%-strength solution of sodium hydroxide, the pH value of the reaction mixture is kept at 9–10. After completion of the addition, the mixture is stirred for 30 minutes at 80° C.; $SO_2$ at 3 atmospheres gauge is then added to the solution in an autoclave and heating at 110° C. is effected for 8 hours. After the pressure has been released, the reaction product is separated, it is purified by distillation and there is obtained, in 80% yield, bis-(n-trifluoromethyl-phenyl)-disulfide with a refractive index of $n_D^{20}=1.5365$.

(c)
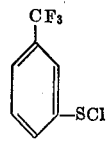
(IIIa)

The disulfide obtained according to (b) is dissolved in dry carbon tetrachloride, and chlorine is introduced into this solution at room temperature until saturation. After removal of the solvent, 3-trifluoromethylbenzenesulfenic acid chloride is obtained as a red oil which is further purified by distillation. The refractive index is $n_D^{20}=1.5142$; the yield is 84% of theory.

The halogen-substituted sulfenic acid chlorides set forth in the following Table can be prepared in analogous manner:

| Constitution | Refractive index | Yield (percent of theory) |
|---|---|---|
| (IIIb) 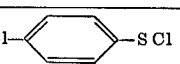 | $n_D^{20}=1.5448$ | 94 |
| (IIIc) 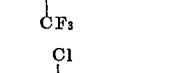 | $n_D^{20}=1.5329$ | 88 |
| (IIId) 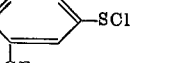 | $n_D^{20}=1.5557$ | 91 |
| (IIIe) 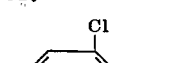 | $n_D^{20}=1.5682$ | 98 |
| (d) 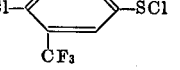 | | (1) |

To 22 g. (0.1 mole) of 3-trifluoromethylbenzenesulfenic acid chloride obtained in (c), in 200 cc. of methylene chloride there are added, at 20 to 25° C., 15 g. of O,O-dimethylthiophosphite. After one hour's stirring, the mixture is washed until there is a neutral reaction, dried, and subsequently distilled. There are obtained 27 g. (=89% of theory) of the desired O,O-dimethyl-S-(3-trifluoromethylphenyl)-dithiophosphoric acid ester of the boiling point 87° C.0.01 mm. Hg and the refractive index $n_D^{23}$ =1.5262.

Analogously, the following compounds are obtained:

| Constitution | | Physical properties (refractive index, boiling point, melting point) | Yield (percent of theory) |
|---|---|---|---|
| (4) | $(C_2H_5O)_2\overset{S}{\overset{\|}{P}}-S-\underset{}{\langle\underset{}{\rangle}}-CF_3$ | $n_D^{23}$=1.5118 | 94 |
| (2) | $(CH_3O)_2\overset{S}{\overset{\|}{P}}-S-\underset{}{\langle\underset{}{\rangle}}\overset{CF_3}{-}-Cl$ | $n_D^{24}$=1.5467 | 71 |
| (5) | $(CH_3O)_2\overset{S}{\overset{\|}{P}}-S-\underset{Cl}{\langle\underset{}{\rangle}}\overset{CF_3}{-}$ | 51–53° C. | 60 |
| (6) | $(CH_3O)_2\overset{S}{\overset{\|}{P}}-S-\underset{Cl}{\langle\underset{}{\rangle}}\overset{CF_3}{-}-Cl$ | 61–63° C. | 65 |
| (7) | $(CH_3O)_2\overset{S}{\overset{\|}{P}}-S-\underset{}{\langle\underset{}{\rangle}}\overset{Cl\ \ CF_3}{-}-Cl$ | 116° C./0.01 mm. Hg | 81 |
| (3) | $(C_2H_5O)_2\overset{S}{\overset{\|}{P}}-S-\underset{}{\langle\underset{}{\rangle}}\overset{CF_3}{-}-Cl$ | $n_D^{24}$=1.5307 | 88 |

It will be appreciated that the instant specification and examples are set forth by way of illustration and not limitation, and that various modifications and changes may be made without departing from the spirit and scope of the present invention.

What is claimed is:

1. O,O-dialkyl-S-phenyl-dithiophosphoric acid esters of the formula:

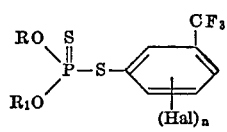

(I)

in which

R and $R_1$ each is an alkyl radical with 1 to 6 carbon atoms,

Hal is a halogen atom, and n is an integer from 0 to 4.

2. Compounds according to claim 1 in which R and $R_1$ each is an alkyl radical with 1–4 carbon atoms, Hal is a chlorine atom and n is 0, 1 or 2.

3. The compound according to claim 1 wherein such compound is O,O-dimethyl-S-(3-trifluoromethylphenyl)-dithiophosphate of the formula

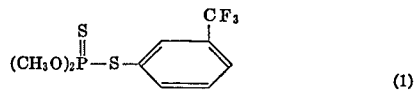

(1)

4. The compound according to claim 1 wherein such compound is O,O-diethyl-S-(3-trifluoromethylphenyl)-dithiophosphate of the formula

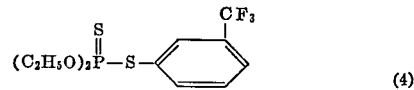

(4)

5. The compound according to claim 1 wherein such compound is O,O-dimethyl-S-(3-trifluoromethyl-4-chlorophenyl)-dithiophosphate of the formula

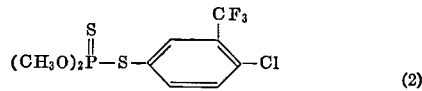

(2)

6. The compound according to claim 1 wherein such compound is O,O-dimethyl-S-(3-trifluoromethyl-6-chlorophenyl)-dithiophosphate of the formula

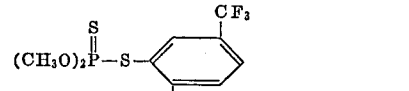

(5)

7. The compound according to claim 1 wherein such compound is O,O-dimethyl-S-(3-trifluoromethyl-4,6-dichlorophenyl)-dithiophosphate of the formula

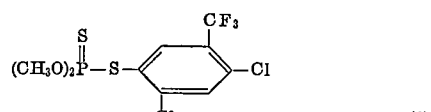

(6)

8. The compound according to claim 1 wherein such compound is O,O-dimethyl-S-(3-trifluoromethyl-2,4-dichlorophenyl)-dithiophosphate of the formula

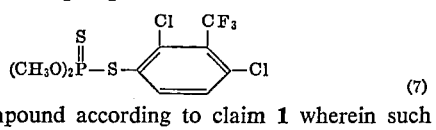

(7)

9. The compound according to claim 1 wherein such compound is O,O-diethyl-S-(3-trifluoromethyl-4-chlorophenyl)-dithiophosphate of the formula

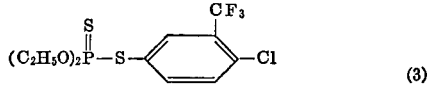

(3)

References Cited

UNITED STATES PATENTS 3,351,682   11/1967   Baker _____ 260—955

FOREIGN PATENTS 1,223,833   9/1966   Germany _____ 260—955
1,215,171   4/1966   Germany _____ 260—964

ANTON H. SUTTO, Primary Examiner

U.S. Cl. X.R.

260—543 H, 608, 970; 424—225